United States Patent
Brenner et al.

(10) Patent No.: US 8,155,036 B1
(45) Date of Patent: Apr. 10, 2012

(54) PORTABLE MULTI-LEVEL SECURITY COMMUNICATIONS SYSTEM

(75) Inventors: Robert E. Brenner, New Richmond, WI (US); Timothy P. Sullivan, Apple Valley, MN (US); Jeffrey N. Houle, Lakeland, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 304 days.

(21) Appl. No.: 12/708,839

(22) Filed: Feb. 19, 2010

(51) Int. Cl.
*H04B 3/36* (2006.01)
*H04L 12/66* (2006.01)
(52) U.S. Cl. ........................ 370/293; 370/352
(58) Field of Classification Search .......... 370/274–279, 370/293, 307, 315, 352–356
See application file for complete search history.

(56) References Cited

U.S. PATENT DOCUMENTS

| | | | | |
|---|---|---|---|---|
| 5,524,134 | A * | 6/1996 | Gustafson et al. | 455/410 |
| 7,720,461 | B2 * | 5/2010 | Thornton et al. | 455/410 |
| 2007/0222588 | A1 * | 9/2007 | Wolfe | 340/539.13 |
| 2008/0201375 | A1 * | 8/2008 | Khedouri et al. | 707/104.1 |
| 2008/0201376 | A1 * | 8/2008 | Khedouri et al. | 707/104.1 |
| 2009/0254572 | A1 * | 10/2009 | Redlich et al. | 707/10 |

* cited by examiner

*Primary Examiner* — Hong Cho
(74) *Attorney, Agent, or Firm* — Hamre, Schumann, Mueller & Larson, P.C.

(57) ABSTRACT

A portable multi-level security communications system (system) provides a communications backbone for Internet Protocol (IP) based data at multiple levels of security and allows on-board users to communicate, with each other and an outside network, while maintaining separation from the on-board communication system. The system can connect to an outside network using a fast, reliable connection without impeding or conflicting with current on-board operating systems. The system is able to run multiple security enclaves while maintaining separation between the enclaves and their users.

14 Claims, 4 Drawing Sheets

PORTABLE MULTI-LEVEL SECURITY COMMUNICATIONS SYSTEM

FIELD

This disclosure relates to a portable multi-level security communications system (system) that provides a communications backbone for Internet Protocol (IP) based data at multiple levels of security.

BACKGROUND

In radio rooms, e.g. military aircraft common radio rooms, users of individual computers may need to communicate and collaborate with other networks or other individual computer users, in the same security enclave, in order to share information. In order to communicate, the users generally are required to share the main on-board communications system. This presents problems in that the users are using bandwidth that could be essential to the operations of the mission. In order for users to communicate, multiple communications systems with their own network paths and access portals are used. This can introduce cross modulation of signals, be expensive, slow, and in an area where space is at a premium, e.g. an aircraft, the duplication of equipment takes up valuable space.

SUMMARY

A portable multi-level security communications system (system) is described that provides a communications backbone for Internet Protocol (IP) based data at multiple levels of security and allows on-board users to communicate, with each other and an outside network, while maintaining separation from the on-board communication system. The system can connect to an outside network using a fast, reliable connection without impeding or conflicting with current on-board operating systems. The system is able to run multiple security enclaves while maintaining separation between the enclaves and their users.

The system can be portable and is able to be removed from and transported to various locations due to its size. But, the system is not limited as a portable system and can be installed in place, for example, on a telecommunications rack.

No specific applications are provided in the operating system of the system but are provided in a removable hard drive as encrypted information. When the hard drive is removed, the system becomes a "dumb system" in that no operating data remains within the system and the system is inoperable. Therefore, no special clearances are required for personnel to move and relocate the system and the system is not required to be maintained in a secured area.

The system is configured to allow multiple users, within the same security enclave, to collaborate and communicate without the need to access a network. The system is further configured so that each security enclave level, such as sensitive but unclassified (SBU), secret, and top secret, has its own server within the system with each server working in parallel with other components. Each enclave will host Voice over Internet Protocol (VoIP) and data services to include, but not be limited to, telemetry, imagery, email and data. The enclaves can also host wireless devices including wireless personal digital assistant's (PDA) and cellular telephones. The multiple security enclaves are able to access and use the backbone system concurrently without collision of data streams and crosstalk. Sharing of information between the different security enclaves levels is not permitted.

One use of the server, for example, would be in an aircraft. The system can be loaded onto the aircraft before a mission and is not electrically or physically connected to the on-board communications systems or servers. The system is linked to a radio frequency transceiver that is connected to an antenna allowing the system to communicate to a satellite system. The signal would be set at a higher frequency than the on-board communications so cross modulation of signals is avoided and the system cannot impede the operations of the on-board communications systems. Upon completion of the mission, the system can be easily removed from the aircraft or left in place for future missions.

Another exemplary use of the system would provide "office in the sky" services. Users will have voice and data services to other on-board users within their security enclave, to other users as relayed through the downlink site and back to their home base, and to any other applications as in their terrestrial office. The flexibility of the backbone allows any data source/sink, as long as it is in IP streams. And, while the system does not tie into or supplant the on-board communications systems, the system can support an interface to those on-board systems.

The system is advantageous because it allows sharing of data among users and allows connection to an outside network while maintaining high security. The system is an environment-oriented system in that it will not work as any ordinary communications system. The set-up is configured to work concurrently with SBU, secret or top secret security enclaves. Due to the configuration, there can be no cross over between the enclaves or between the system and any other computer or communications system in the specific environment. The system provides a sharepoint set-up on a secure network where users, within the same enclave, can interface and exchange data without leaving the secure network.

Other advantages of the system include, but are not limited to: the provision of a common secure network that users may access to collaborate without the need to access an outside network while providing the ability to access an outside network, if needed; the ability to negate collisions between unsecured data and secure data; the relatively instantaneous sharing of data between users; limiting the use of expensive bandwidth space on satellite and terrestrial links; and, in general, the cost effectiveness of the system.

DRAWINGS

DETAILED DESCRIPTION

A portable communications management system (system) 10 is described that provides a communications backbone for Internet Protocol (IP) based data at multiple levels of security and allows on-board users to communicate, with each other and an outside network, while maintaining separation from the on-board communication system. The system provides a fast, reliable network without impeding or conflicting with current on-board operating systems. The system is able to run multiple security enclaves while maintaining separation between the enclaves and their users.

For ease of discussion, the system will be described as being a portable system as provided on a military aircraft. It is to be noted that this in no way limits other uses of the portable communications management system. The system is able to be used on any type of transport vehicle to include, but not be limited to, ships, submarines, trains, trucks and buses. It is to be further understood that the system is not limited to transport vehicles and is able to be used in land-based structures, to include, but not be limited to, offices, warehouses, bunkers, laboratories, and field command offices. Additionally, the system is not limited solely as a portable system and is able to be installed as a permanent communications system if needed.

Figure 1:
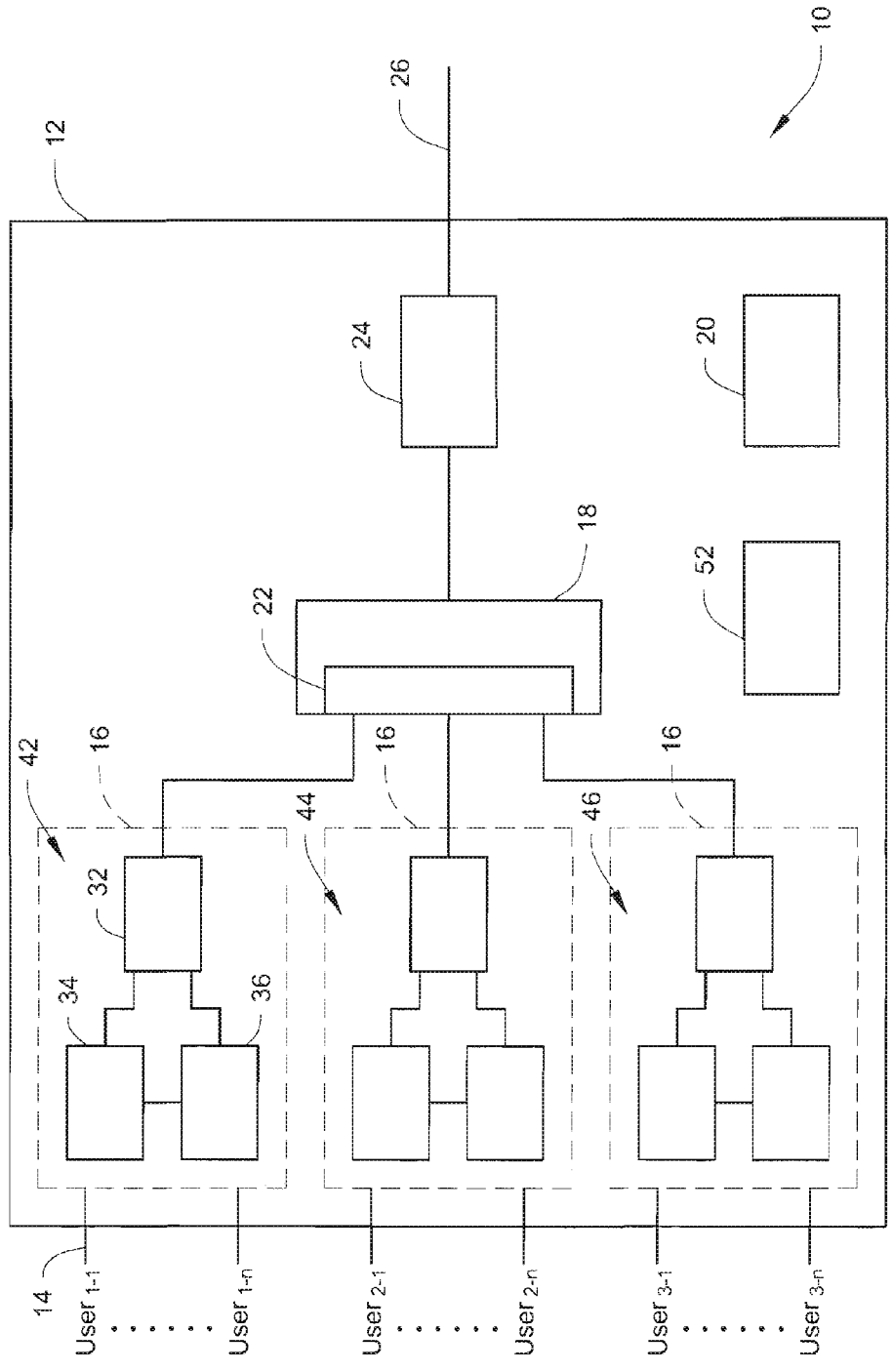
FIG. 1 illustrates a high level diagram of the portable communications management system.

Referring to FIG. 1, the portable communications management system (system) 10 has a housing 12, a plurality of user interfaces 14, a plurality of security enclave servers 16, a control device 18, a radio frequency communications transceiver 24, an electrical connector 20, and a connection 26 to a terrestrial network.

The housing 12 is configured to accept various electronic components and to contain the system 10. The housing 12 can be mounted on wheels, can have carrying handles, or can be a laptop computer, thereby providing ease of movement and portability. Additionally, the housing 12 can be configured to be rack mounted for a permanent installation.

The electrical connector 20 is connected to the system 10 components. The electrical connector 20 connects to an exterior power supply obtaining power to run the system 10. The electrical connector 20 can be any type of connection device, such as a plug, terminal or wire, so long as the connection can be temporary. It is to be noted that the system 10 is not limited to obtaining power through the electrical connector 20. In one embodiment, the system 10 can be provided with batteries.

Figure 4:
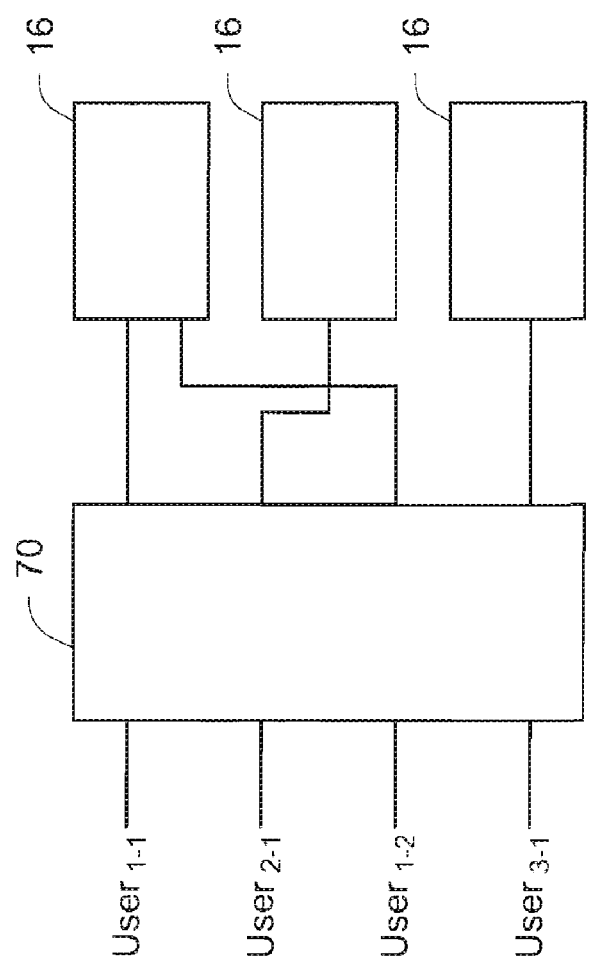
FIG. 4 illustrates one embodiment of a router used as a user interface.

The plurality of user interfaces 14 are provided on or within the housing 12 with each interface 14 connected to a specific security enclave server 16 or router 70 (shown in FIG. 4). The interfaces 14 are provided to allow users to access and interface with the enclave server 16 in order to transmit and receive data to and from the enclave server 16 and to enable the sharing of data between users. The interfaces 14 can be any type of connection that allows the user to access the enclave server 16, for example, wireless or wired. The wireless connection uses some form of energy, e.g. radio frequency (RF), infrared light, laser light, visible light, acoustic energy, etc., to transfer information without the use of wires. The wired connections can include RS-232, USB, Category 5, or any type of connector that performs the function of connecting components and transmitting data.

Figure 3:
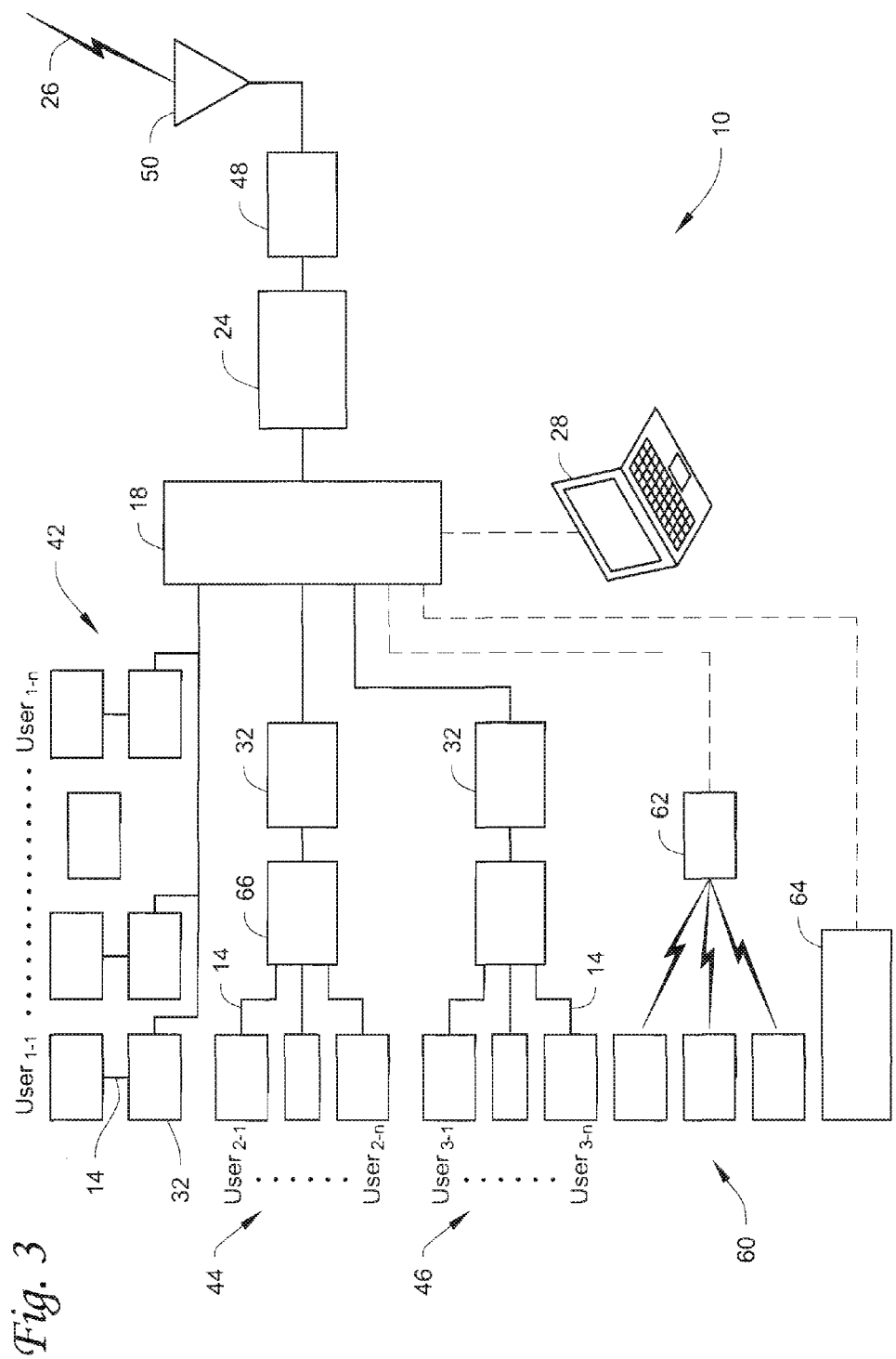
FIG. 3 illustrates one configuration of the portable communications management system.

As shown in FIGS. 1 and 3, the user interfaces 14 allow user 1-1 to user 1-*n* to connect a specific security enclave 16. User 2-1 to user 2-*n* and user 3-1 to user 3-*n* are further illustrated as connecting to separate and specific security enclaves 16.

In one embodiment, as shown in FIG. 4, a router 70 can be provided as the user interface 14 and be connected to the enclave servers 16. This permits the user to connect to any available user interface 14 and be routed, by the router 70, to the appropriate security enclave server 16 based on the security level of the user. As shown, even though the users have not connected to the router in numerical order, user 1-1 and user 1-2 are routed to the first layer security enclave 16, user 2-1 is routed to the second layer security enclave 16, and user 3-1 is routed to the third layer security enclave 16. The user is then further authenticated, by security policy and the operating system. This authentication is between the physical computer, the network, and the encryption device.

Figure 2:
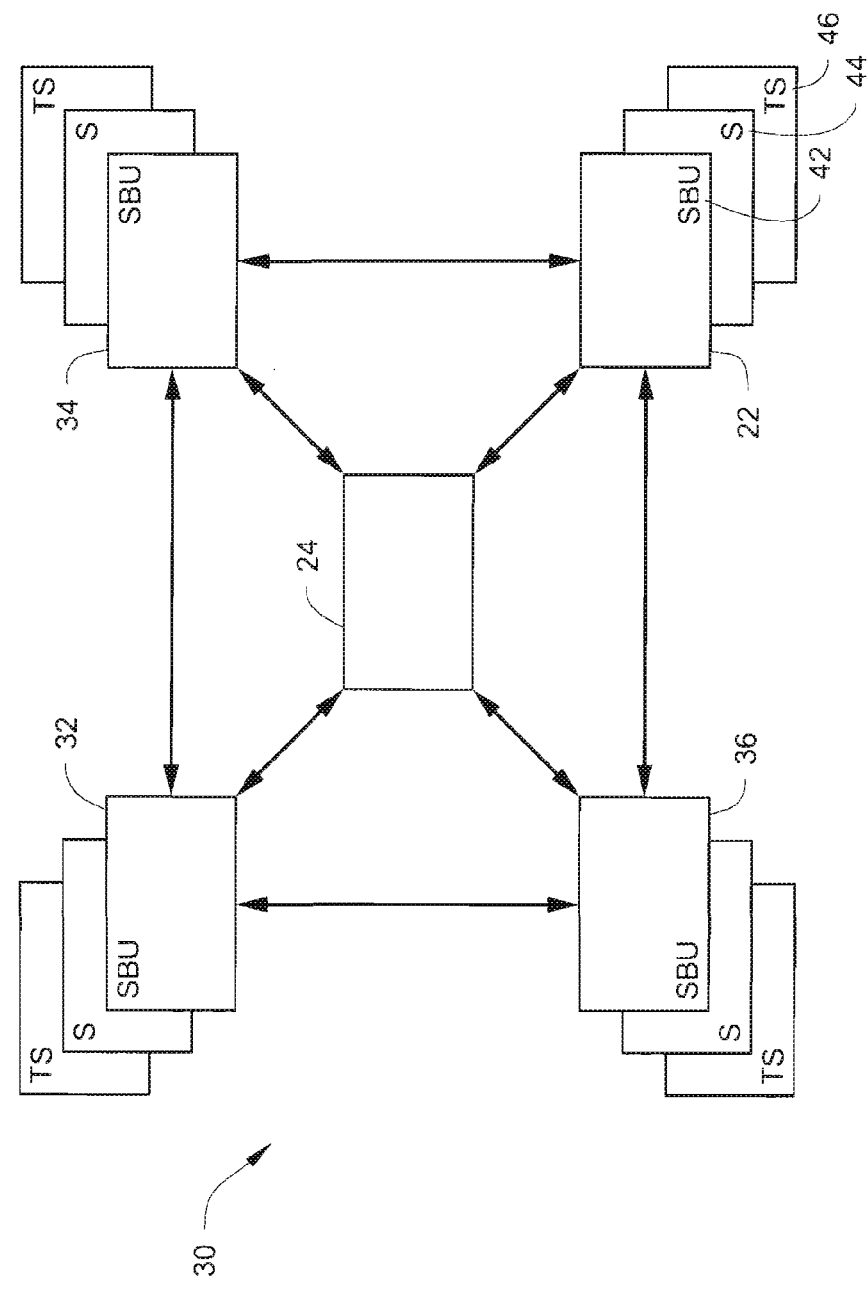
FIG. 2 illustrates the layering of individual security enclaves and connection to a common radio frequency transceiver.

The plurality of security enclave servers 16 are provided within the housing 12 as a server stack 30, as shown in FIG. 2. As shown in FIG. 1, the enclave servers 16 are layered to maintain operating separation and operate independently of any other enclave server 16. Each enclave server 16 is assigned a specific security level, such as sensitive but unclassified (SBU) 42, secret (S) 44, or top secret (TS) 46. In order to access an outside network, each enclave server 16 communicates information to the common radio frequency transceiver 24 independently of any other enclave server 16.

Each enclave server 16, as shown in FIG. 2, can contain encryption devices 32, data conversion devices 34, Voice over Internet Protocol (VoIP) device 36, and a network management system (NMS) 22. Each of the devices 22, 32, 34, 36 is able to share and configure the data with any one or all of the other devices 22, 32, 34, 36. In one embodiment, as illustrated in FIG. 1, the NMS 22 can be located externally to the enclave server 16 as a component in the control device 18. In another embodiment, as shown in FIG. 3, the NMS can also be provided as a laptop computer 28 that connects to the control device 18 to allow user input to control the network.

The NMS 22 monitors, configures, controls and manages the communications system 10. The NMS 22 configures the system 10 by installing, initializing, loading, modifying and tracking the configuration parameters of the network hardware and software. The NMS 22 manages the security of the system 10 by restricting access to the network resources, authenticating users, and controlling the encryption services 32. The NMS 22 manages the performance of the system 10 including the management of packet transmission, traffic management, data management, logging in and monitoring users, and the determination of which network line is to be used.

The communications backbone of the portable communications management system 10 is based on the Open Systems Interconnection (OSI) type networking model which divides network architecture into seven layers. The backbone will provide the physical layer, layer 1, up through the presentation layer, layer 6. All applications, the seventh layer, will be provided by the NMS 22 and will interface with the connection service. The lower layer connection pathways will be abstracted from the application layer, and the applications will not need to know over what channels they are operating. This will allow maximum flexibility in the user applications to be supported by the backbone.

The encryption devices 32 encrypt the data by transforming data using an algorithm making it unreadable to anyone except those possessing special knowledge, a passcode or a key. The word encryption also refers to the reverse process, decryption, which makes the encrypted information readable again. Suitable encryption devices 32 include, but are not limited to, Type 1 and Type 3 devices. Data is encrypted within the enclave server 16 prior to being transmitted to an outside network. Encrypted data that is transmitted into the enclave server 16 is decrypted by the encryption devices 32.

The data conversion devices 34 manage the data, by converting data into new data formats, within the enclave server 16. Information is input into the system, whether by computer, sensors, streaming video, still pictures, audio, etc., and is converted to a data stream or different format. The data conversion devices 34 manipulate and transfer the data as required. This can include the conversion of the data from one format to another, correcting incorrect data, filtering out unwanted data, and consolidating data into new databases and other data subsets. A data conversion device 34 can also translate continuous analog signals into proportional discrete digital signals.

The Voice over Internet Protocol (VoIP) device 36 converts voice conversations to data allowing transmission over the data network. The VoIP device 36 allows the users to place secure calls since digitizing and digital transmission are in place with the VoIP device 36. It is only necessary to encrypt and authenticate the existing data stream.

The control device 18 is comprised of a multiplexer and demultiplexer. The multiplexer uses Time Division Multiplexing (TDM) to transmit the individual data signals from the multiple security enclave servers 16 simultaneously over one communications medium while maintaining separation and security of the data. As shown in FIG. 1, the converted signals are tunneled to the radio frequency communications transceiver 24 for further transmission to an outside network. The demultiplexer uses TDM to convert data received from an outside network and transmit it into the appropriate data stream to the correct security enclave server 16. An advantage of using TDM to multiplex the data signals from the multiple security enclave servers 16 is that every enclave server 16 is able to share the same radio frequency connection. This eliminates the need for multiple systems, each with their own paths and access.

The radio frequency (RF) communications transceiver 24 is also provided within the housing 12. The RF communications transceiver 24 is responsible for down-converting received signals from radio frequency to baseband frequency, and up-converting the transmitted signal in the opposite direction. The RF communications transceiver 24 is connected to a satellite communications terminal 48 which is in turn connected to an antenna 50, as shown in FIG. 3. The antenna 50 is configured to communicate with any type of satellite system and over any microwave frequency band, including S band, C band, X band, $K_u$ band, K band, and $K_a$ band.

In order to maintain the security of the system 10, a removable hard drive 52, as shown in FIG. 1, is removably connected to the housing 12. The removable hard drive 52 includes all of the non-volatile memory of the portable communications management system 10. The removable hard drive 52 hosts collaboration services or tools, sharepoint files, programs, data, and files as encrypted data. The removable hard drive contains all non-volatile memory that is used by the system 10. Therefore, all operational data or files are hosted on the removable hard drive 52 and are not stored in the system 10. Classified, secret and top secret information can be written and saved to the removable hard drive 52. The removable hard drive 52 is configured to be removed from the system 10 upon completion of operations and removal of the hard drive 52 makes the system 10 inoperable.

A removable hard drive 52 can be provided for each security enclave server 16 or one removable hard drive 52 system can be provided for all of the security enclave servers 16.

Upon insertion of the removable hard drive 52 in the system 10, users can access the system 10 by entry of a pass code or key. The removable hard drive 52 can host network information and the individual user information, such as security levels, passwords, access permissions, etc. The individual user information is used to authenticate the user and allow access to the system.

The removable hard drive 52 is transferable from one system 10 to another so that the system 10 does not have to be transported to a new location in order to access the data, and all data stored on the removable hard drive 52 can be retrieved through any system 10, dependent on the entry of the correct pass code. Once the removable hard drive 52 is connected to a system 10, the users are able to start a new session or go back to the previous session once the pass code or key is entered.

The connection 26 to a terrestrial network can be wired or wireless. The wireless connection uses some form of energy, e.g. radio frequency (RF), infrared light, laser light, visible light, acoustic energy, etc., to transfer information without the use of wires. The wired connection can be any form of communications media making a physical connection including coaxial cable, fiber optics, and twisted pair.

FIG. 3 is one embodiment of a portable communications management system (system) 10 with three specific security levels, sensitive but unclassified (SBU) 42, secret (S) 44, and top secret (TS) 46. Each security level 42, 44, 46 is shown with encryption devices 32. The secret 44 and top secret 46 levels are further shown with decision making capabilities 66, where the decision making capabilities 66 can comprise any or all of the data conversion device 34, Voice over Internet Protocol (VoIP) device 36, and the network management system (NMS) 22. In one embodiment, as shown, the NMS 22 can be located externally to the decision making capability 66. In another embodiment, the NMS 22 can be provided as a laptop that connects to the system 10.

Also shown are wireless devices 60 transmitting to a common wireless access point (WAP) 62. The wireless devices 60 can be any type of personal communications device, including personal digital assistants (PDA) and cellular telephones. The WAP 62 connects the wireless devices 60 to the communications system 10 via the control device 18. The wireless devices 60 have Type 1 encryption devices built-in so the data sent to the NMS 22 is encrypted. The WAP 62 is connected to the NMS 22 to enable the analysis, management and appropriate routing of the data.

An internal communication unit (ICU) 64 can also be provided and connected to the control device 18. The ICU 64 is an interface between the on-board communications system and the Internet Protocol (IP) system. The ICU 64 allows for a physical connection, secure transport and IP connectivity and routing between the two systems while ensuring security by leveraging the functions of encryption, authentication, and tunneling. By using the ICU 64, the on-board communications system of the aircraft can plug in and send and receive data.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A portable communications management system, comprising:
   a housing;
   an electrical connector connected to the portable communications management system;
   a plurality of security enclave servers within the housing wherein each security enclave server contains one or more of an encryption device, a network management system, a data conversion device, or a voice over internet protocol device;
   a control device within the housing;
   a radio frequency communications transceiver within the housing connected to the control device;
   a plurality of user interfaces on or within the housing connected to a plurality of security enclave servers;
   a removable hard drive removably connected to the housing and connected to the control device, the removable hard drive includes all of the non-volatile memory of the portable communications management system; and a connection to a terrestrial network connected to the radio frequency communications transceiver.

2. The portable communications management system of claim 1, wherein each of the security enclave servers includes the encryption device, the network management system, the data conversion device, and the voice over internet protocol device.

3. The portable communications management system of claim 2, wherein the network management system is exterior to its respective security enclave server.

4. The portable communications management system of claim 2, wherein the network management system is provided as a laptop computer.

5. The portable communications management system of claim 2, wherein the network management system contains all applications necessary to run the portable communications management system.

6. The portable communications management system of claim 1, wherein the security enclave servers comprise a plurality of security levels, wherein the security levels comprise sensitive but unclassified, secret, and top secret.

7. The portable communications management system of claim 1, wherein the control device comprises a multiplexer and a demultiplexer, wherein the multiplexer and the demultiplexer use Time Division Multiplexing.

8. The portable communications management system of claim 1, wherein the removable hard drive contains user information.

9. The portable communications management system of claim 1, wherein the removable hard drive contains network information.

10. The portable communications management system of claim 1, wherein the removable hard drive contains sharepoint files.

11. The portable communications management system of claim 1, wherein the removable hard drive contains operational data and files.

12. The portable communications management system of claim 1, further comprising a wireless access point within the housing and connected to the control device.

13. The portable communications management system of claim 1, further comprising an internal communication unit within the housing and connected to the control device.

14. The portable communications management system of claim 1, further comprising a router within the housing and connected to the plurality of security enclave servers.

* * * * *